W. E. MORTON.
SIDE CAR FOR MOTOR CYCLES.
APPLICATION FILED NOV. 29, 1920.

1,437,115.

Patented Nov. 28, 1922.
3 SHEETS—SHEET 1.

INVENTOR
William Ernest Morton

W. E. MORTON.
SIDE CAR FOR MOTOR CYCLES.
APPLICATION FILED NOV. 29, 1920.

1,437,115.

Patented Nov. 28, 1922.

INVENTOR
William Ernest Morton
by Dowden O'Brien
atty.

Patented Nov. 28, 1922.

1,437,115

UNITED STATES PATENT OFFICE.

WILLIAM ERNEST MORTON, OF CHORLTON-CUM-HARDY, ENGLAND.

SIDE CAR FOR MOTOR CYCLES.

Application filed November 29, 1920. Serial No. 427,181.

*To all whom it may concern:*

Be it known that I, WILLIAM ERNEST MORTON, a British subject, residing at Chorlton-cum-Hardy, Manchester, England, have invented certain new and useful Improvements in Side Cars for Motor Cycles, of which the following is a specification.

This invention relates to the under carriage or chassis of a side car by which such is connected or attached to the frame of a motor cycle.

It is designed to provide that the vertical axis of the side car body and side car wheel will be maintained parallel or approximately parallel with that of the cycle when the latter is canted in turning a corner, or in other words, that the side car will cant with the cycle.

The invention consists in so constructing the chassis of a side car and coupling it to a motor bicycle that the side car body and wheel will be canted or tilted to right or left corresponding to the movement of the motor cycle necessitated when turning corners.

The invention will be fully described with reference to the accompanying drawings.

The motor cycle A is of any ordinary or known construction to which a side car can be affixed.

Figure 4:
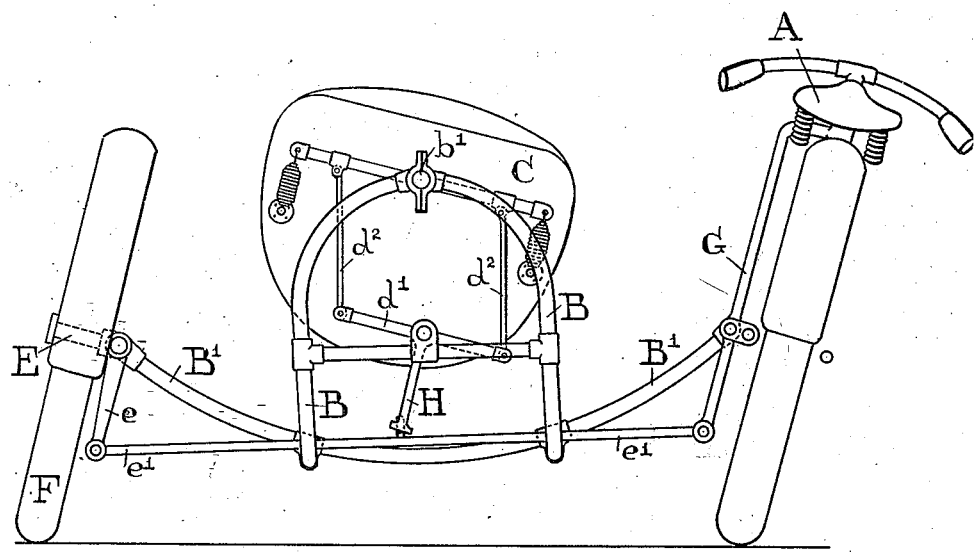
Fig. 4 is an elevation from rear showing cycle and side car in inclined or canted position.

The side car chassis comprises a longitudinal frame B extending from the front to the rear to which the side car body C is suspended. The longitudinal supporting frame is attached or coupled to the frame of the motor cycle A by rigid front and rear transverse bars or members B' B² by swivelling or articulated joints which will allow the cycle to cant over into an inclined position when travelling round corners (as shown in Fig. 4.)

The frame B is constructed with bearings at the ends to receive trunnions or pivots b' which can swivel or rock therein. By the trunnions b' the side car body C is suspended from the frame B through the intervention of a supporting bar D connected to the car body by springs d. The springs d may be coil springs as shown. This construction permits the body C to cant or tilt to one side or the other as may be desired.

A stub axle E for the wheel F is pivoted to the rear transverse frame member B' so that the wheel F can be inclined while the chassis B and the transverse member B' retain their ordinary horizontal position.

Figure 1:
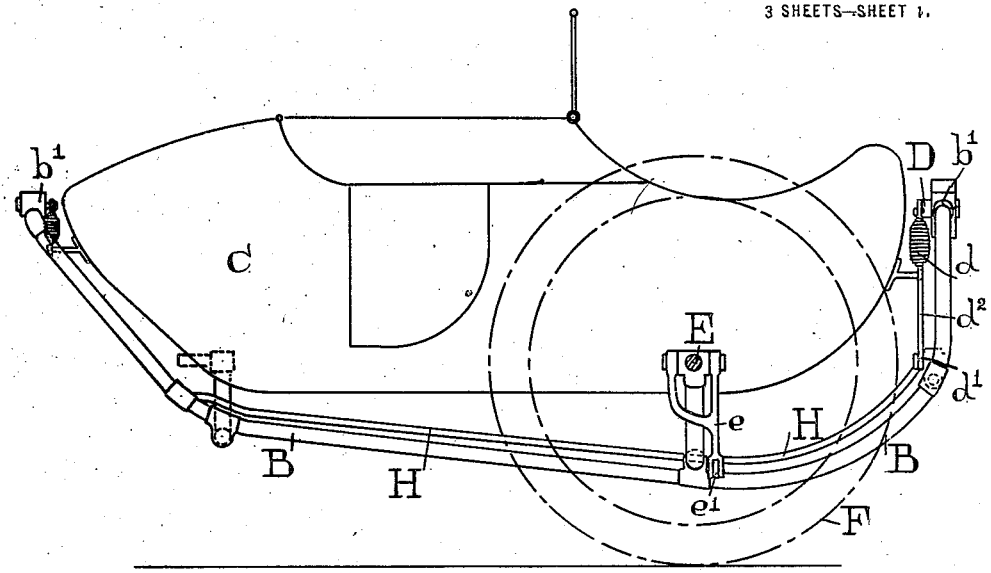
Fig. 1 is a side elevation of side car and chassis.
Figure 2:
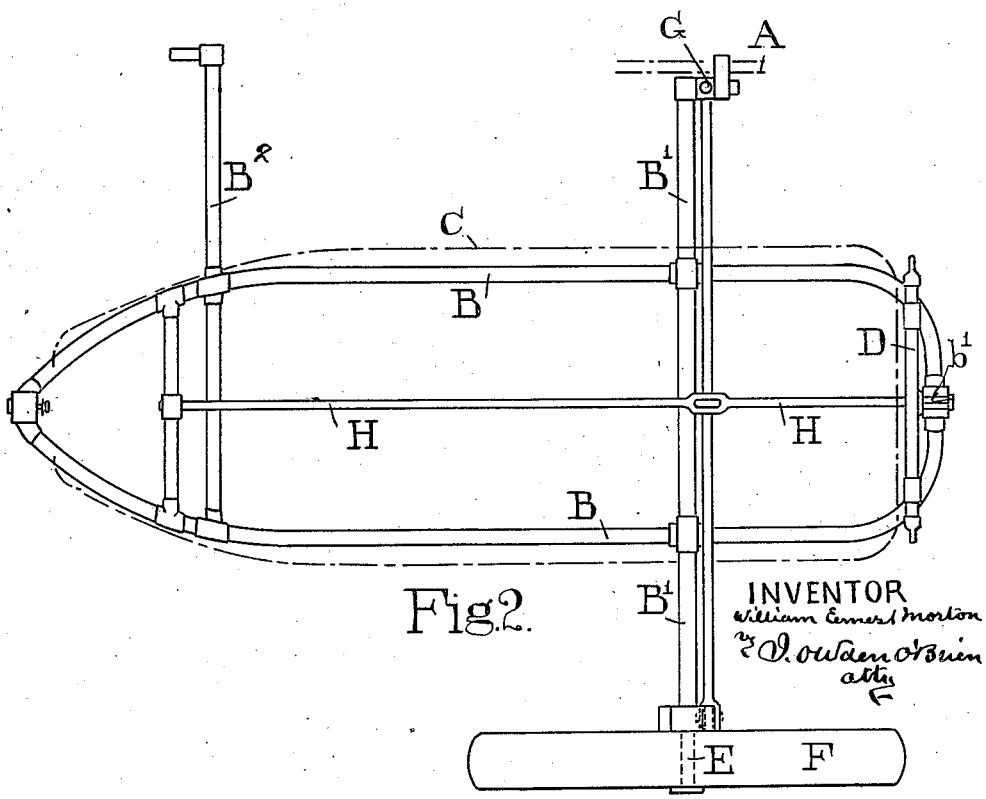
Fig. 2 is a plan of chassis.
Figure 3:
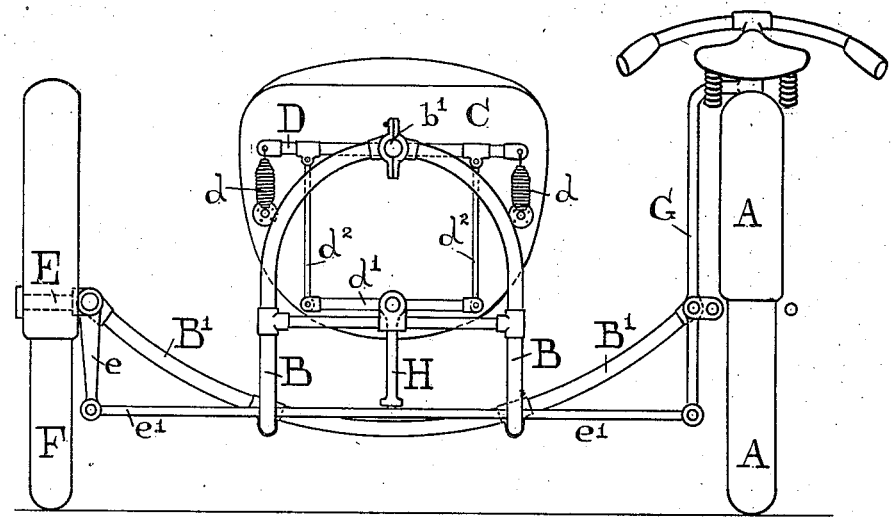
Fig. 3 is an elevation from rear showing the cycle and side car in upright position.
Figure 5:
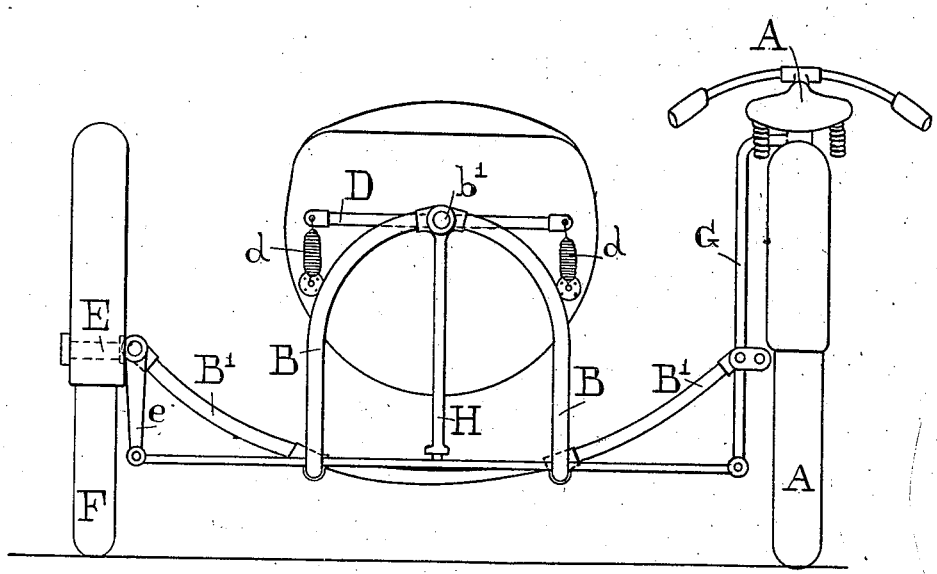
Fig. 5 is an elevation from rear showing a modification.

The axle E is connected or coupled to the motor cycle A by a lever e and link or coupling rod e' and a lever G. The lever G is pivoted to the end of the transverse member B' and is affixed by its upper end to the frame of the cycle A. At or near its centre the link or coupling rod e' engages a lever H which is connected direct to the supporting bar D and trunnions b' (as in Fig. 5) or through the intervention of a second rocking bar d'' connected to the supporting bar D by rods or links $d^2$ (as in Figs. 3 and 4).

The inclination of the cycle A either to right or left inclines the lever G in the same direction, and this through the rod or link e' and lever e inclines the wheel F on the stub axle E to a corresponding degree, and at the same time moves the lever H and rocks the side car body over at the same time (as shown in Fig. 4). Thus the cycle A, the side car wheel F, and side car body C always cant over or incline to one side or the other simultaneously as may be demanded by the requirement of the rider of the motor cycle.

What I claim as my invention and desire to protect by Letters Patent is:—

1. In a chassis for a motor cycle side car the combination with a longitudinal frame from which the body is suspended, and rigid front and rear transverse frame members by which to couple it to the motor cycle, of a horizontal rocking bar and trunnions above the centre of gravity of the body upon which the body is suspended, a stub axle for the wheel pivoted to the rear transverse member, a lever connected to the stub axle, a transverse link pivoted thereto and connected to the frame of the motor cycle, and a lever extending beneath the body to engage the transverse link and cause the wheel and the body to cant or tilt corresponding to the movement of the motor cycle.

2. In a chassis for a motor cycle side car the combination with a longitudinal frame to support the body, and a transverse member to couple it to the motor cycle of a stub axle to carry the wheel pivoted to the transverse member, a lever attached to said axle, a lever pivoted to the other end of the transverse member attached at its upper end to the cycle and at its lower end connected by a link with the lever on the wheel axle and means to connect the link with and rock the side car body.

In testimony whereof I have hereunto set my hand in presence of two subscribing witnesses.

WILLIAM ERNEST MORTON.

Witnesses:
J. OWDEN O'BRIEN,
GEORGE H. O'BRIEN.